(12) United States Patent
Durgin et al.

(10) Patent No.: US 8,564,435 B2
(45) Date of Patent: Oct. 22, 2013

(54) PASSIVE ENVIRONMENTAL SENSING

(75) Inventors: Gregory David Durgin, Atlanta, GA (US); Andrew F. Peterson, Atlanta, GA (US); Azhar Hason, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 357 days.

(21) Appl. No.: 12/991,736

(22) PCT Filed: Jun. 24, 2009

(86) PCT No.: PCT/US2009/048364
§ 371 (c)(1),
(2), (4) Date: Nov. 9, 2010

(87) PCT Pub. No.: WO2010/008874
PCT Pub. Date: Jan. 21, 2010

(65) Prior Publication Data
US 2011/0057791 A1    Mar. 10, 2011

Related U.S. Application Data

(60) Provisional application No. 61/075,146, filed on Jun. 24, 2008.

(51) Int. Cl.
*G08B 1/08* (2006.01)
(52) U.S. Cl.
USPC .................................. 340/539.27; 340/572.1
(58) Field of Classification Search
USPC ........ 340/539.27, 539.26, 10.41, 10.1, 572.1; 455/419; 324/600
See application file for complete search history.

(56) References Cited

U.S. PATENT DOCUMENTS

| | | | |
|---|---|---|---|
| 6,025,725 A | 2/2000 | Gershenfeld et al. | |
| 6,229,445 B1 | 5/2001 | Wack | |
| 6,294,997 B1 | 9/2001 | Paratore et al. | |
| 6,599,442 B2 | 7/2003 | Green | |
| 6,642,016 B1 | 11/2003 | Sjoholm et al. | |
| 6,927,687 B2 | 8/2005 | Carrender | |
| 6,970,699 B1 | 11/2005 | Hagerty et al. | |
| 7,209,042 B2 | 4/2007 | Martin et al. | |
| 7,446,660 B2 * | 11/2008 | Posamentier | 340/572.1 |
| 7,649,283 B2 * | 1/2010 | Tonn et al. | 324/207.13 |
| 2005/0168325 A1 | 8/2005 | Lievre et al. | |
| 2005/0248455 A1 | 11/2005 | Pope et al. | |

(Continued)

OTHER PUBLICATIONS

Hagan, Martin T., and Menjhaj, Mohammad B., "Training Feedforward Networks with the Marquardt Algorithm", IEEE Transactions on Neural Networks. vol. 5, No. 6, Nov. 1994, pp. 989-993.

(Continued)

*Primary Examiner* — John A Tweel, Jr.
(74) *Attorney, Agent, or Firm* — Thomas| Horstemeyer, LLP.

(57) ABSTRACT

Various sensors, systems, and methods for monitoring environmental conditions are provided. In one embodiment, among others, a passive sensor includes an antenna; a modulating circuit coupled to the antenna by a microstrip transmission line, the modulating circuit capable of modulating a backscattered signal; a sensing material disposed between the microstrip transmission line and a ground plane of the passive sensor, where an electrical property of at least a portion of the sensing material varies with the environmental condition; and where the modulated backscattered signal includes at least one of phase and amplitude information corresponding to the electrical property of the portion of the sensing material.

18 Claims, 4 Drawing Sheets

(56) References Cited

U.S. PATENT DOCUMENTS

| | | |
|---|---|---|
| 2005/0275533 A1 | 12/2005 | Hanhikorpi et al. |
| 2006/0202821 A1 | 9/2006 | Cohen |
| 2006/0203882 A1 | 9/2006 | Makela et al. |
| 2006/0238309 A1 | 10/2006 | Takatama |
| 2007/0090926 A1 | 4/2007 | Potyrailo et al. |
| 2007/0222590 A1 | 9/2007 | Posamentier |

OTHER PUBLICATIONS

Lee, C. Q., "Wave Propagation and Profile Inversion in Lossy Inhomogeneous Media", Proceedings of the IEEE, vol. 70, No. 3, Mar. 1982, pp. 219-228.

Yang, H. W. and Chen, R. S., "FDTD Analysis on the Effect of Plasma Parameters on the Reflection Coefficient of the Electromagnetic Wave", Opt Quant. Electron, vol. 39, 2007, pp. 1245-1252.

Kemppinen, Esa, "Effective Permittivity and Attenuation Coefficient of Microstrip Transmission Line Determined by 1-Port and 2-Port Measuring Methods", Microstrip Transmission Line by 1-Port and 2-Port Measuring Methods, Nokia Telecommunications, Wireless Transmission Products, Karaportti 2, FIN-02610, Espoo, Finland, 2000 IOP Publishing Ltd.

Hoole, S. Ratnajeevan H., "Artificial neural Networks in the Solution of Inverse Electromagnetic Field Problems," IEEE Transactions on Magnetics, vol. 29, No. 2, Mar. 1993, pp. 1931-1934.

Elshafiey, I., Udpa, L, and Udpa, S.S., "Application of Neural Networks in Inverse Problems in Electromagnetics", IEEE Transactions on Magnetics, vol. 30, No. 5, Sep. 1994, pp. 3629-3632.

Caorsi, Salvatore, and Gamba, Paolo, "Electromagnetic Detection of Dielectric Cylinders by a Neural Network Approach", IEEE Transactions on Geoscience and Remote Sensing, vol. 37, No. 2, Mar. 1999, pp. 1309-1314.

Bermani, Emanuela, and Caorsi, Salvatore, "Microwave Detection and Dielectric Characterization of Cylindrical Objects from Amplitude-Only Data by Means of Neural Networks", IEEE Transactions on Antennas and Propagation, vol. 50, No. 9, Sep. 2002, pp. 1309-1314.

Yaman, Faith, and Simcsek, Serkan, Neural network Approach to Determine Nonsmooth One-Dimensional Profiles in Inverse Scattering Theory, Microwave and Optical Technology Letters, vol. 49, No. 12, Dec. 2007, pp. 3158-3162.

Griffin, Joshua D. and Durgin, Gregory D, Complete Link Budgets for Backscatter Radio and Rfid Systems, IEEE Antennas and Propagation Magazine—IEEE Antennas Propag Mag, vol. 51, No. 2, pp. 11-25, 2009.

Moller, Martin Fodslette, "A Scaled Conjugate Gradient Algorithm for Fast Supervised Learning", Neural Networks, vol. 6, 1993, pp. 525-533.

Battitti, Roberto, "First- and Second-Order Methods for learning: Between Steepest Decent and newton's Method", Neural Computation, vol. 4, pp. 141-166, 1992.

Marquardt, Donald W., "An Algorithm for Least-Squares Estimation of Nonlinear Parameters", Journal of the Society for Industrial and Applied Mathematics, vol. 11, No. 2, (Jun. 1963), pp. 431-441.

International Search Report and Written Opinion in related PCT Application No. PCT/US2009/048364, mailed Aug. 26, 2009.

\* cited by examiner

PASSIVE ENVIRONMENTAL SENSING

CROSS REFERENCE TO RELATED APPLICATIONS

This application is the 35 U.S.C. §371 national stage of PCT application PCT/US2009/048364, filed on Jun. 24, 2009 with U.S. Patent Office, the disclosure of which is hereby incorporated by reference, claiming priority to co-pending U.S. provisional application entitled "Passive Sensors Using Reflected Electro-Material Signatures" having Ser. No. 61/075,146, filed Jun. 24, 2008, which is entirely incorporated herein by reference.

BACKGROUND

The ability to monitor environmental conditions for perishable goods can provide significant value to the supply chain by ensuring that products remain fresh and safe when supplied to the consumer. In some cases, tracking changes in the environmental conditions over time without battery-operated conventional electronics may be desirable for condition verification during the supply process.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
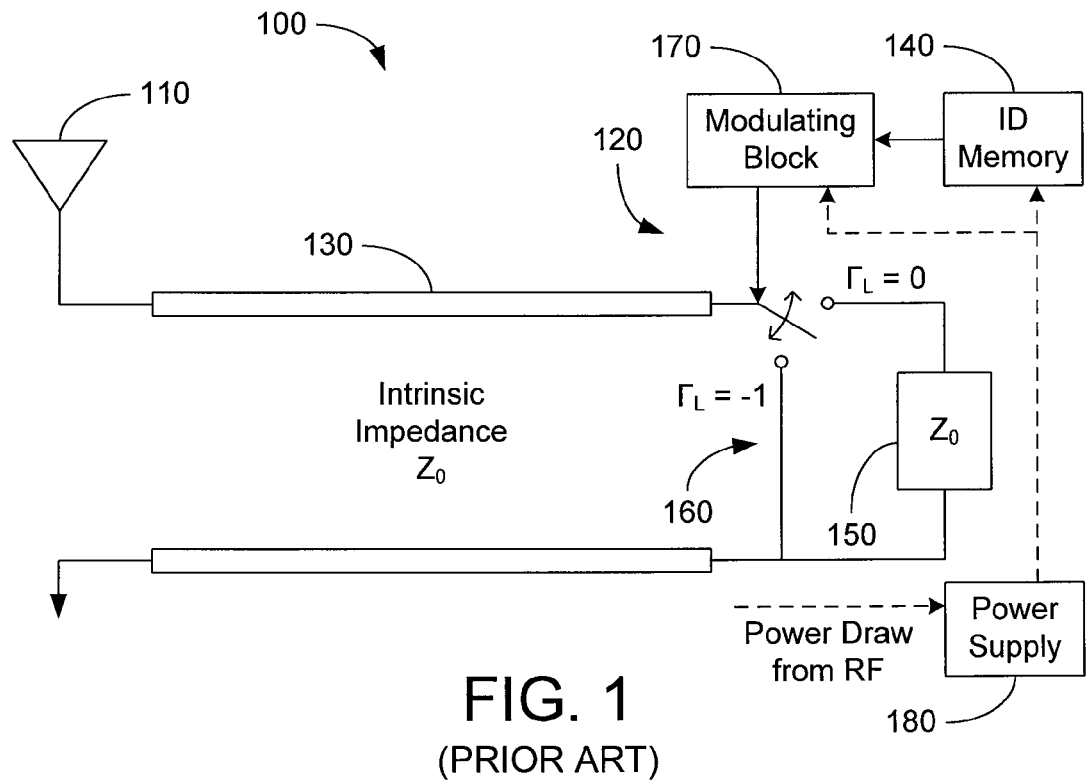
FIG. 1 is a graphical representation of a Radio Frequency (RF) tag for backscattering radio waves.

To allow tracking on an item level, passive sensors without an integrated power supply can provide cost advantages. Radio frequency identification (RFID) can be used to provide one form of passive sensor without complex circuitry, specialty components, or batteries. FIG. 1 is a graphical representation of a Radio Frequency (RF) tag 100 for backscattering radio waves. The RF tag 100 contains an antenna 110 coupled to a modulating circuit 120 through a transmission line 130. The RF tag 100 also includes a non-volatile memory 140. These components work together to form a passive device that is capable of modulating information on backscattered signals or radio waves.

The modulating circuit 120 of the RF tag 100 connects the antenna 110 to either a load 150 or an electrical short 160 as illustrated in FIG. 1. The impedance ($Z_O$) of the load 150 is matched to the intrinsic impedance ($Z_O$) of the transmission line 130. When the matched load 150 is connected, power received by the antenna 110 is transmitted into the load 150, where this power is absorbed without reflection. When the short 160 is connected, the received power is reflected back through the transmission line 130 and reradiated through the antenna 110 as a backscattered signal.

By switching between the matched load 150 and electrical short 160, it is possible to modulate data onto the backscattered radio waves. For the case of RFID, the tag 100 modulates a unique binary sequence of 1s and 0s—the object identification code stored in memory 140—onto the backscattered waves. The modulation block 170, which controls the switching of the modulating circuit 120, and the memory 140 are driven using a small DC power supply 180 that draws power from incident radio waves using an on-board charge pump, which rectifies and steps-up the voltage of the incident RF wave.

Figure 2:
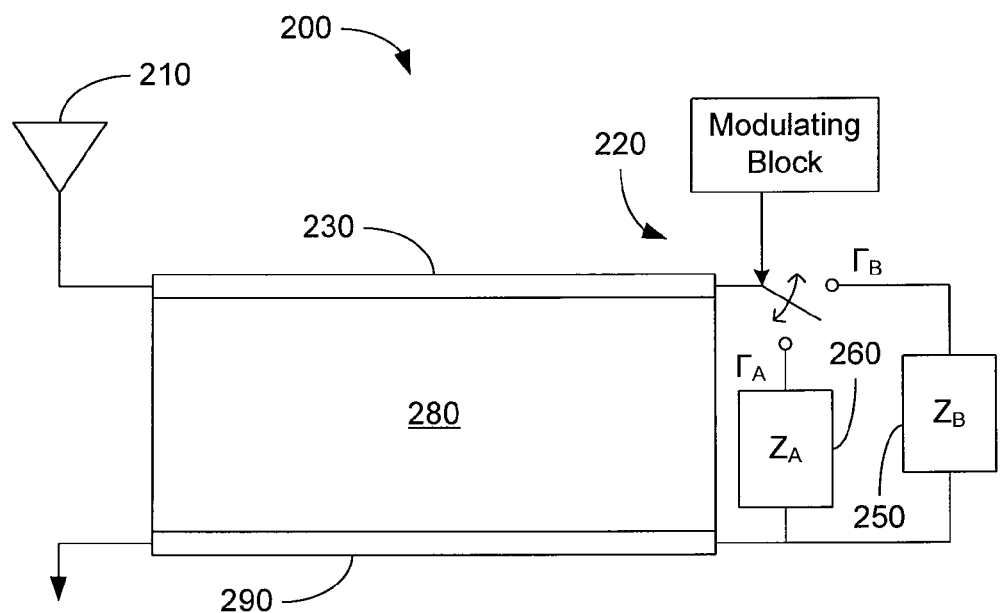
FIG. 2 is a graphical representation of a passive RF sensor including a sensing material for environmental sensing using modulated backscattering of radio waves in accordance with one embodiment of the present disclosure.

FIG. 2 is a graphical representation of one embodiment of a passive RF sensor 200 for environmental sensing using modulated backscattering of radio waves. The embodiment of FIG. 2 includes an antenna 210 coupled to a modulating circuit 220 through a microstrip transmission line 230 which is routed over a sensing material 280. The modulating circuit 220 of the sensor 200 connects the antenna 210 to either a first load 250 or a second load 260 as illustrated in FIG. 2. The modulating circuit 220 may be implemented as a RF integrated circuit (RFIC). The impedances ($Z_A$ and $Z_B$) of the first and second loads 250 and 260 differ to provide modulation of the backscattered radio wave signals. In some embodiments, the second load may be a short ($Z_B$=0). In other embodiments, additional loads may be provided to allow for more complex modulation and/or increased measurement sensitivity.

The sensing material 280 is disposed between the microstrip transmission line 230 and a ground plane 290 of the passive sensor 200. The impedance of at least a portion of the sensing material 280 varies with environmental conditions to provide sensing. The impedance of the sensing material 280 takes the place of the intrinsic impedance ($Z_o$) of the homogeneous dielectric of the conventional transmission line 130 in FIG. 1. With the microstrip transmission line 230 disposed on one side of the sensing material 280, variations in the sensing material impedance affect the phase and/or amplitude of the backscattered radio waves, allowing for determination of the sensed environmental condition.

Sensing material 280 can comprise any material where the permeability, permittivity, and/or conductivity are sensitive to environmental conditions. For example, the sensing material 280 can include, but is not limited to, thermotropic liquid crystals, piezoelectric materials, and polymers with metallic nanoparticles and/or superparamagnetic nanoparticles. Thermotropic liquid crystals, which experience state disordering that causes changes in permittivity and conductivity depending on the temperature, can include, but are not limited to, para-azoxyanisole. Piezoelectric materials, which change their electrical properties based on applied pressure or force, can include, but are not limited to, lithium niobate or quartz. Nanoparticles can be embedded (or doped) in polymer substrates such as, but not limited to, PPT (polypropylene terephthalate), PET (polyethylene terephthalate), and acrylics. Such devices can use the nonlinear relationship between field and flux density components to sense external field strengths. Nanoparticles can include metallic nanoparticles such as, but not limited to, copper and silver or superparamagnetic nanoparticles such as, but not limited to, iron. In some embodiments, the nanoparticles have a diameter of about one to about fifteen nanometers. In other embodiments, the diameter may be larger or smaller.

Figure 3:
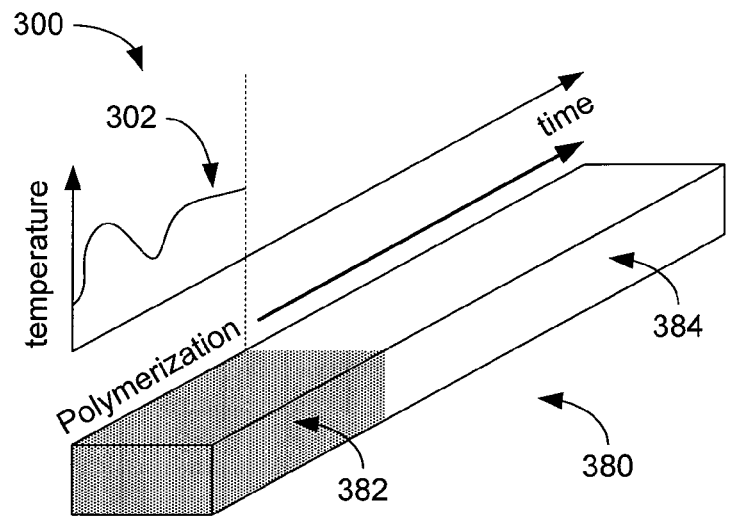
FIG. 3 illustrates a sensing material, such as that included in FIG. 2, that can "record" the time ordered variation of an environmental condition in accordance with one embodiment of the present disclosure.

In some embodiments of the passive RF sensor 200, the sensor material can include slow-polymerizing monomers mixed in with the thermotropic liquid crystals. Thermotropic liquid crystals experience state disordering upon heating, causing their electrical and optical properties to change. An auto-oxidizing reaction mixture can be used to initiate polymerization at one end of an exemplary sensing material 380 as illustrated in FIG. 3. The monomers slowly knit together as the polymerization proceeds along the length of the sensor material 380, fixing the liquid crystal ordering at the time of polymerization in place to "record" variations in the environmental condition that affects the liquid crystals. In the embodiment of FIG. 3, the degree of ordering of the liquid crystals in the substrate—and, hence, their electrical properties—depends upon the temperature experienced at the time the compounds were locked into position when their cell area polymerized. In other embodiments, the liquid crystals may be affected by other environmental conditions such as, but not limited to, the presence and/or concentration of solvents.

This process is illustrated in FIG. 3 where a first portion 382 of the sensing material 380 has been polymerized. Liquid crystals along the line are effectively "frozen" in their mechanically disordered state, thereby trapping a time ordered record of temperature-induced effects. As illustrated by the plot 300, the fixed electrical properties of the sensing material 380 along the length of the polymerized portion 382 correspond to the temperature variation curve 302. The liquid crystals in a second, unpolymerized portion 384 of the sensing material 380 remain free to reorder in response to changes in the sensed environmental condition. As the polymerization continues to proceed along the length of the sensing material 380, the variations in temperature over time are recorded. The properties of these "frozen" liquid crystals are linked to the local capacitance and conductivity of the sensing material, which may then be electrically interrogated at a later time. By knowing the time progression of the polymerization, a time ordered history of the environmental condition can be established.

Figure 4:
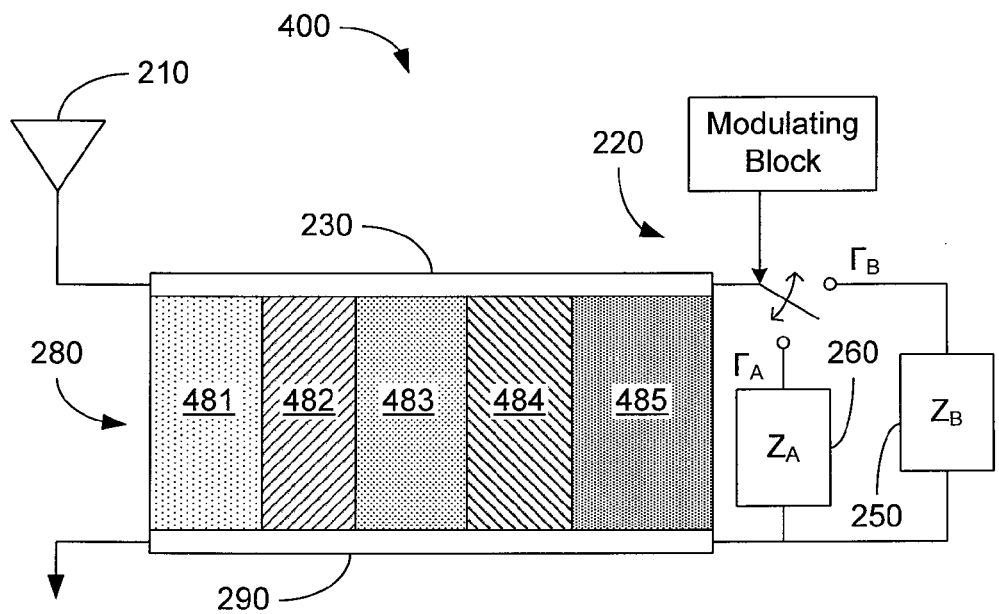
FIG. 4 is a graphical representation of the passive RF sensor of FIG. 2 where the sensing material includes a plurality of material segments in accordance with one embodiment of the present disclosure.

In other embodiments of the passive RF sensor 200 of FIG. 2, the sensing material 280 comprises a plurality of material segments, one or more of which are sensitive the changes in one or more environmental condition. FIG. 4 is a graphical representation of a passive RF sensor 400 where the sensing material 280 includes a plurality of material segments or bins 481-485. Variations in the electrical properties of one or more of the material bins can alter the phase and/or amplitude of radio waves that are backscattered by the passive sensor 200. In one embodiment, a plurality of the material segments is affected by the same environmental condition. For example, the permittivity of material segments 482 and 484 may both be affected by the same environmental condition (e.g., temperature). In some embodiments, multiple segments may comprise the same material, and thus vary in the same way to changes in the environmental condition. In another embodiment, the material segments 482 and 484 may comprise different materials whose electrical properties (e.g., permittivity) vary differently with the same change in the environmental condition.

Figure 5:
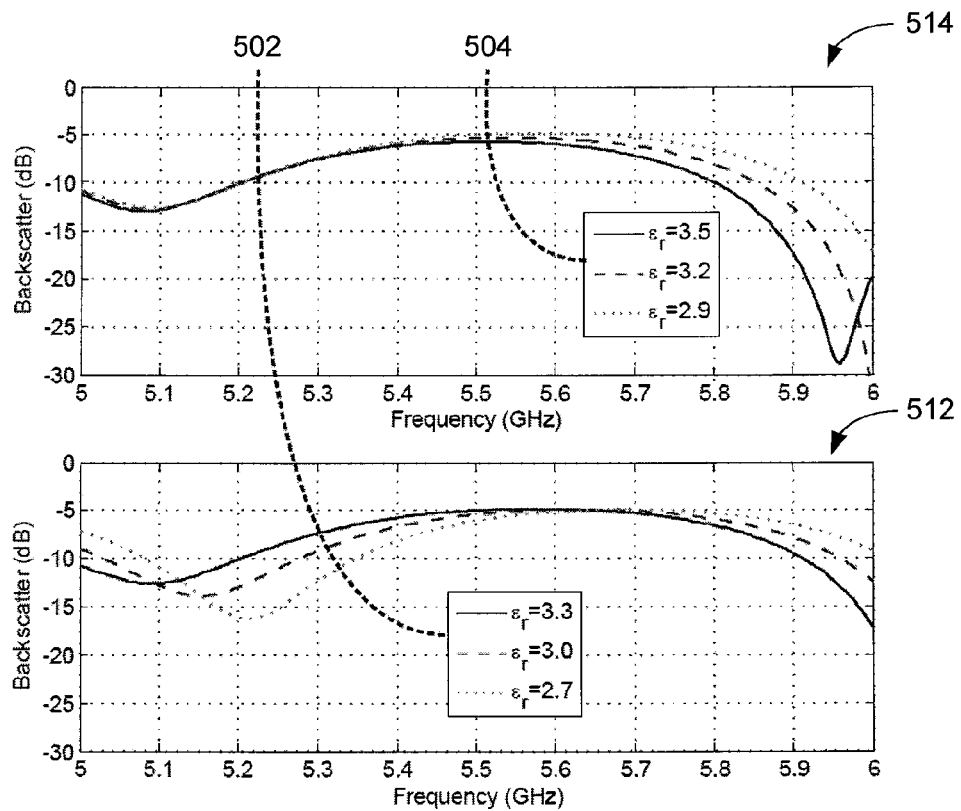
FIG. 5 illustrates an effect of variations in different segment materials of the passive RF sensor of FIG. 4 on backscattered signals in accordance with one embodiment of the present disclosure.

FIG. 5 illustrates how the amplitude of backscattered signals can be affected by variations in the different segment materials (e.g., 482 and 484). In the exemplary illustrations of FIG. 5, perturbations in the permittivity of the different segment materials 482 and 484 can influence the amplitude of the reflected signals differently over a given frequency spectrum. For example, under static load conditions, changes in the permittivity 502 of the segment material 482 alters the power scattered out of the passive sensor over a range of 5-6 GHz as shown in dB-scale graph 512. A similar set of changes in the permittivity 504 of the segment material 484 changes the power scattered out of the passive sensor as shown in dB-scale graph 514. This time however, changes in the segment material property 504 are manifested most strongly at the higher frequencies of the same range. Characteristic changes in the phase angle of the reflected (or backscattered) signals may also be produced by changes in the electrical property. In some embodiments, one or both of the phase and amplitude of the backscattered signals is affected. The environmental condition can then be identified based on the backscattered signals at different frequencies over the frequency range.

In other embodiments, the properties of different material segments may be affected by the different environmental conditions. For example, the permittivity of segment material 482 may be affected by changes in ambient temperature while segment material 484 may be affected by changes in the magnetic field surrounding the passive sensor. Different materials can have profiles that produce a unique frequency response, which can be identified based on the reflected (or backscattered) signals at different frequencies over the frequency range. Similarly, segments of the sensing material 380 of FIG. 3 that have been polymerized may be interrogated over a range of frequencies to determine the environmental condition at the time of polymerization. By knowing the rate at which the polymerization advances through the sensing material 380, the time of the "recorded" condition may be determined.

Figure 6:
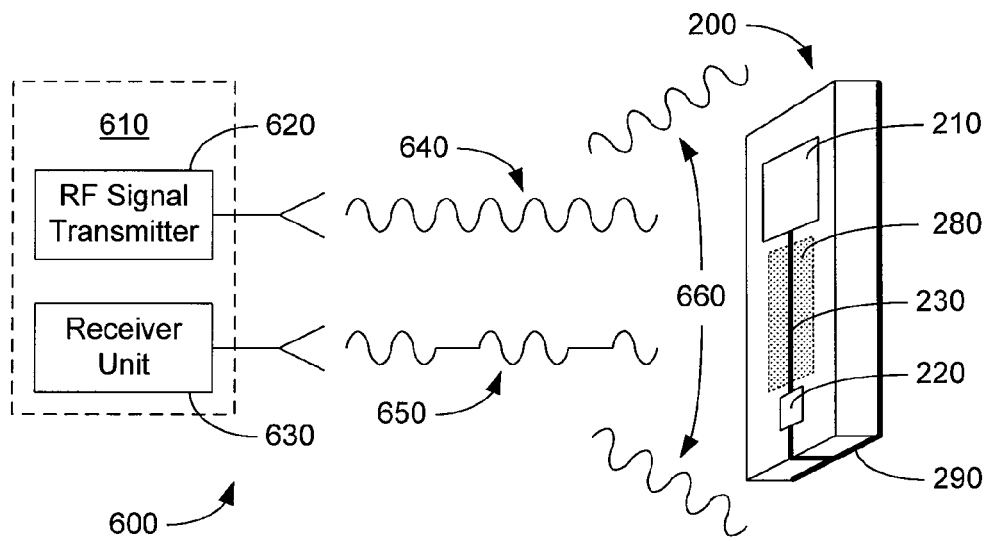
FIG. 6 is a graphical representation of a sensing system including the passive RF sensor of FIG. 2 in accordance with one embodiment of the present disclosure.

Backscattered signals can be obtained from a passive sensor by using radio frequency identification (RFID). FIG. 6 is a graphical representation of a sensing system 600 including the passive RF sensor 200 of FIG. 2 and a RF reader or interrogator 610. Operation of the RFID sensing system 600 can be described with respect to FIG. 6. The RF reader 610 includes a transmitter 620 and a receiver 630 or a transceiver. The transmitter unit 620 in the RF reader 610 transmits or radiates a continuous radio wave signal 640 towards the passive sensor 200, which may be attached to an object. When the passive sensor 200 is interrogated by the RFID reader 610, the probing wave 640 enters the antenna 210, travels down the microstrip transmission line 230 to the modulating circuit 220, which is powered up by the incident radio waves. The waveform is reflected back down the microstrip transmission line 230, with modulation, to the antenna 210 where it is re-radiated back towards the RFID reader 610. In one embodiment, the modulation of the backscattered signal 650 includes the passive sensor 200 identification. In alternative embodiments, the modulations may include telemetry data associated with the passive sensor 200. The modulated backscattered RF signal 650 is received by the receiver 630 of the RFID reader 610, along with many unmodulated multipath waves 660 scattered from the nearby environment. The receiver unit 630 processes the received signals 650 and 660 and extracts (or filters) the desired backscattered signal 650 from all of the received signals 650 and 660 based on the modulation information.

The use of a modulated signal 650 effectively isolates or identifies the signal as containing information corresponding to the sensor material 280, since the RF reader 610 can separate (or filter) the modulated signal 650 from any other background interference 660. The technique has the added benefit of introducing data on the modulated signal that can serve as identification or point-of-origin information associated with the passive sensor and/or the object.

This process is repeated for multiple predefined frequencies within a predefined frequency band. In some embodiments, the frequency range is from about one to about six GHz. In other embodiments the frequency range is from about three to about six GHz, about five to about six GHz, or about 5.150 to about 5.85 GHz. Alternatively, the frequency range may be wider or narrower than those described. The predefined frequencies may be at a fixed interval (or step size) over the predefined frequency band or may be specified frequencies that are distributed within the frequency band.

The received RF signals 650 include the frequency-response of the sensor material 280 embedded within its measurement. The sensed environmental condition may then be back-solved by the RFID reader 610. As the frequency of the transmitted waves 640 increases, the wavelength decreases and the spatial resolution of the sensing material 280 becomes finer. For example, in the case of the polymerized sensor material 380 (FIG. 3), the time ordered electrical property (e.g., temperature) profile captured by the polymerized liquid crystal matrix can be interrogated. In the material sensor 380, use of higher frequency signals allows resolution of fluctuations in the environmental condition over smaller time periods. Similarly, shorter wavelengths can improve resolution of the different material segments 481-485 of FIG. 4.

The use of GHz frequencies also has a variety of other benefits, including:
- Increased Range: With use of directional antennas at the RFID reader 610, the overall sensor-reader separation distance may be boosted.
- Increased Reliability: The smaller wavelength allows the passive RF sensors 200 to use multiple antennas 210 in a small footprint, reducing small-scale fading problems.
- Resistance to On-Sensor Degradations: The higher frequencies help isolate the passive RF sensor 200 from performance losses when placed on metallic or electromagnetically lossy objects.
- Increased Bandwidth: There is 300 MHz of non-contiguous, unlicensed radio spectrum available between 5.150 and 5.85 GHz that would allow for a variety of signaling options to enhance reliability, range, and resolution.

Figure 7:
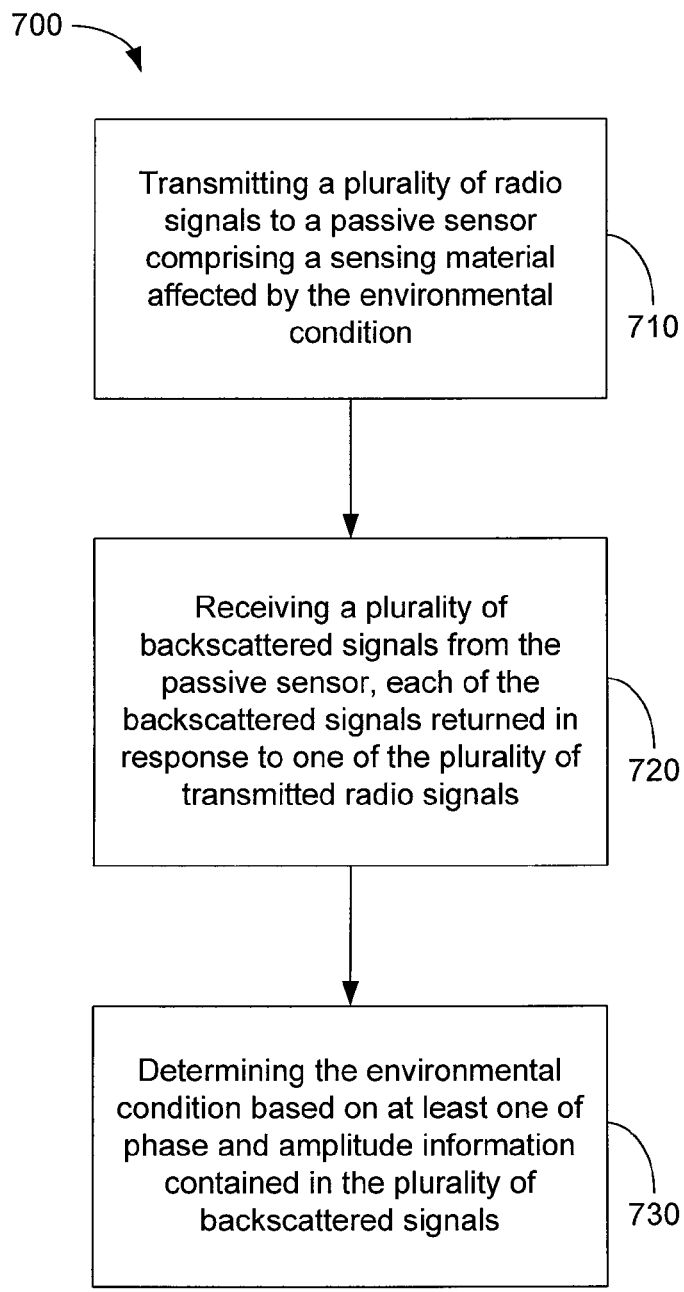
FIG. 7 is a flow chart illustrating an exemplary method for monitoring an environmental condition in accordance with one embodiment of the present disclosure.

FIG. 7 is a flow chart 700 illustrating an exemplary method for monitoring an environmental condition. In block 710, a plurality of radio signals are transmitted to a passive sensor 200 comprising a sensing material 280 affected by the environmental condition. Each of the transmitted radio signals is transmitted at a predefined frequency within a frequency range. For example, the predefined frequencies may be at fixed intervals (or step sizes) over the predefined frequency range. Alternatively, the predefined frequencies may be individually specified frequencies that are distributed within the frequency range.

In block 720, a plurality of backscattered signals are received from the passive sensor. Each of the backscattered signals is returned (or reflected) by the passive sensor 200 in response to one of the plurality of transmitted radio signals. In one embodiment, blocks 710 and 720 are implemented by sequentially transmitting a radio signal at a first predefined frequency and receiving the backscattered signal returned by the passive sensor 200 in response to the transmitted signal, and then repeating the transmitting/receiving steps for the remaining predefined frequencies over the frequency range. Modulation of the backscattered signals by the passive sensor 200 allows for isolation or filtering of the modulated backscattered signals from other unmodulated multipath waves that are scattered from the nearby environment.

In block 730, the environmental condition is determined based on at least one of phase and amplitude information contained in the plurality of backscattered signals. The environmental condition may be determined using only one of either the phase or amplitude information. Alternatively, both phase angle and amplitude information may be utilized in the determination. In one embodiment, the determination is performed by the RFID reader 610. The RFID reader 610 can include hardware and/or software stored in memory and implemented by hardware, such as a processor and/or digital signal processing chip(s), for transforming amplitude and phase information (or frequency-swept measurements) contained in the plurality of modulated backscattered signals 650 back to a value for the monitored environmental condition. Methods for backsolving the electrical profiles, and thus the environmental condition, from swept frequency measurements can include correlating the measurements to a database of profiles, a Newton's solver approach, finite difference time domain techniques, and 1-port and 2-port measurements. Alternatively, a neural network may be utilized to determine the environmental condition from the modulated backscattered radio waves 650.

In general, neural networks include one or more layers of neurons that receive one or more scalar inputs, which are multiplied by a weight. The weighted input may then be added to a bias/offset. The weighted (and offset) input is applied to an activation function (or transfer function) chosen by the designer, whose output is the output of the neuron. With multiple layers, the neuron output is used as the input to the additional (hidden) layers of the neural network. The weights of the neural network are determined by a training process that attempts to match the actual output of the neural network with the desired output corresponding to a set of training inputs. The weights are adjusted to minimize the error between the actual and desired outputs of a group of training sets. Training of the neural network may be considered complete when the error falls below a predetermined threshold.

A neural network can be used to determine the electrical properties of the sensing material 280 (FIG. 2) disposed between the microstrip transmission line 230 and the ground plane 290 based on the reflection coefficient of the backscattered radio waves 650. The transmission line geometry can be modeled as different dielectric materials in a plurality of material segments. Each material segment acts as a two port network, and the complete geometry of cascaded lines can be analyzed in terms of S-parameters and signal flow graphs using:

$$\Gamma_{in} = S_{11} + \frac{S_{12} S_{21} \Gamma_L}{1 - S_{22} \Gamma_L}$$

The complex-valued reflection coefficient contains information about magnitude and phase that can be used to determine the electrical properties of the sensing material 280, and thus the monitored environmental condition.

To train the neural network, a data set containing the magnitude and phase of $\Gamma_{in}$ is determined for a predefined frequency range with a predetermined step size. In one embodiment, a frequency range of 5-6 GHz with a step size of 100 MHz is used. The data set is generated by varying the electrical property for each material segment over an expected range of variation. For example, the dielectric constant of a first segment is varied while the dielectric constants for other segments are held constant. This may be repeated for different combinations of dielectric constants for the other segments or the dielectric constant of another segment may be varied while all other segments are held constant. The resulting data set may then be used to train the neural network to estimate the electrical properties for each material segment. Alternatively, the neural network may be trained to estimate the monitored environmental condition.

When training of the neural network is complete, amplitude and phase information from the plurality of modulated backscattered signals 650, which corresponds with the training data set, can be applied to estimate the monitored environmental condition. In embodiments that monitor more than one environmental condition, the neural network may be trained to estimate each of the monitored environmental conditions. Alternatively, separate neural networks may be utilized to estimate each monitored condition.

Neural networks may also be utilized in embodiments where polymerization proceeds along the length of the sensor material 380 (FIG. 3), fixing the liquid crystal ordering at the time of polymerization. The sensor material 380 may be divided into segments, which are sized to provide a desired time resolution. As described above, one or more neural networks may be trained to estimate the electrical property for each material segment and/or the environmental condition corresponding to each segment. In this way, the time ordered variation in the monitored environmental condition may be determined.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, having thus described the invention, at least the following is claimed:

1. A passive sensor for monitoring an environmental condition, comprising:
   an antenna;
   a modulating circuit coupled to the antenna by a microstrip transmission line, the modulating circuit capable of modulating a backscattered signal;
   a sensing material disposed between the microstrip transmission line and a ground plane of the passive sensor, where an electrical property of at least a portion of the sensing material varies with the environmental condition; and
   where the modulated backscattered signal includes at least one of phase and amplitude information corresponding to the electrical property of the portion of the sensing material.

2. The passive sensor of claim 1, wherein the sensing material is configured to record variations in the environmental condition over time.

3. The passive sensor of claim 2, wherein the sensing material comprises a polymerizing monomer and thermotropic liquid crystals, where polymerization of the monomer fixes the ordering of the thermotropic liquid crystals.

4. The passive sensor of claim 1, wherein the sensing material comprises a plurality of material segments, and wherein an electrical property of at least one of the plurality of material segments varies with the environmental condition.

5. The passive sensor of claim 4, wherein an electrical property of a second material segment varies with a second environmental condition.

6. A system for monitoring an environmental condition, comprising:
   the passive sensor of claim 1; and
   a radio frequency (RF) reader configured to:
      receive the modulated backscattered signal from the passive sensor; and
      determine the environmental condition based on the received modulated backscattered signal.

7. The system of claim 6, wherein the RF reader is further configured to:
   transmit a plurality of RF signals to the passive sensor;
   receive a plurality of modulated backscattered signals from the passive sensor, each modulated backscattered signal returned in response to one of the plurality of transmitted RF signals; and
   determine the environmental condition based on the plurality of received modulated backscattered signals.

8. The system of claim 6, wherein the RF reader is further configured to extract modulated backscattered signals from all received backscattered signals based on the backscattered signal modulation.

9. The system of claim 6, wherein the environmental condition is determined by a neural network based on the plurality of received modulated backscattered signals.

10. The system of claim 6, wherein the environmental condition at a first time and a second subsequent time are determined by a neural network based on the plurality of received modulated backscattered signals.

11. The system of claim 10, wherein the environmental condition is temperature.

12. A method for monitoring an environmental condition, comprising:
   transmitting a plurality of radio signals to a passive sensor comprising a sensing material affected by the environmental condition, each of the plurality of radio signals transmitted at a different predefined frequency within a frequency range;
   receiving a plurality of backscattered signals from the passive sensor, each of the backscattered signals returned in response to one of the plurality of transmitted radio signals; and
   determining the environmental condition based on phase and amplitude information contained in the plurality of backscattered signals.

13. The method of claim 12, further comprising filtering the plurality of backscattered signals from the passive sensor based upon modulation of the backscattered signals.

14. The method of claim 12, wherein the environmental condition is determined by a neural network based on the phase and amplitude information contained in the plurality of backscattered signals.

15. The method of claim 14, wherein a time sequence of the environmental condition is determined by the neural network based on the phase and amplitude information contained in the plurality of backscattered signals.

16. The method of claim 14, wherein the sensing material comprises a first material segment affected by the environmental condition and a second material segment affected by a different environmental condition.

17. The method of claim 16, wherein the environmental condition and the different environmental condition are both determined by the neural network based on the phase and amplitude information contained in the plurality of backscattered signals.

18. The method of claim 14, wherein the sensing material comprises first and second material segments that are both affected by the environmental condition, wherein electrical properties of the first and second material segments vary differently with a change in the environmental condition.

* * * * *

UNITED STATES PATENT AND TRADEMARK OFFICE
CERTIFICATE OF CORRECTION

PATENT NO.        : 8,564,435 B2
APPLICATION NO.   : 12/991736
DATED             : October 22, 2013
INVENTOR(S)       : Durgin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 358 days.

Signed and Sealed this

Fifteenth Day of September, 2015

Michelle K. Lee
*Director of the United States Patent and Trademark Office*